United States Patent Office 3,644,408
Patented Feb. 22, 1972

3,644,408
PROCESS FOR PREPARING MORPHOLINE DISULFIDE
Harry E. Hill, Wallingford, Conn., assignor to R. T. Vanderbilt Company, Inc., New York, N.Y.
No Drawing. Filed Mar. 14, 1969, Ser. No. 807,440
Int. Cl. C07d 87/46
U.S. Cl. 260—246 B    11 Claims

ABSTRACT OF THE DISCLOSURE

This disclosure is concerned with an improved process for preparing morpholine disulfide from morpholine and sulfur monochloride. In the improved process, morpholine, solvent, a critical amount of water and a critical amount of alkali metal hydroxide are mixed prior to any sulfur monochloride addition.

---

It is known that morpholine can be reacted with sulfur monochloride to form morpholine disulfide in accordance with the following equation:

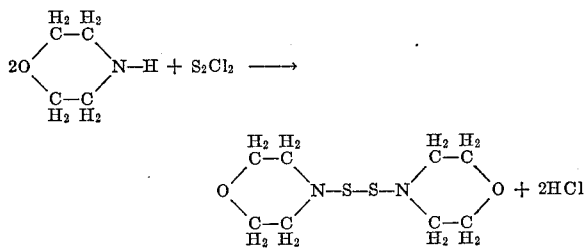

However, this also forms a hydrogen chloride by-product which has an adverse effect upon the yield of morpholine disulfide.

In the past, the formed hydrogen chloride has been neutralized by using an excess of morpholine to provide morpholine hydrochloride as a by-product in addition to morpholine disulfide (U.S. Pat. Nos. 2,259,164 and 2,343,524). It has been necessary, however, to employ expensive and cumbersome extraction steps in order to recover morpholine from this by-product. Furthermore, the morpholine disulfide may have an undesirable pale yellow color.

In another process (U.S. Pat. No. 2,417,954), a concentrated solution, i.e., 35% to 50%, of alkali metal hydroxide has been added to amine and sulfur monochloride reactants in a solvent to prevent the formation of an undesirable chloride by-product. In still another process (U.S. Pat. No. 2,766,236), one-half of the required amount of sulfur monochloride has been added to morpholine in an organic solvent with the morpholine hydrochloride by-product being neutralized subsequently with an aqueous solution of alkali metal hydroxide or the sulfur monochloride has been added concurrently with but slightly ahead of the alkali metal hydroxide solution. There still would be, however, an advantage in increasing further the yield of morpholine disulfide.

It has now been discovered that the yield of morpholine disulfide can be substantially increased without any expensive extraction steps. Thus, in accordance with the present invention a mixture is formed containing morpholine, solvent, a critical amount of water, i.e., at least about 5% based upon the weight of morpholine, and a critical amount of alkali metal hydroxide, i.e., between about 0 and 10% based upon the concentration in water. After this mixture has been formed, sulfur monochloride is added in conjunction with additional alkali metal hydroxide solution.

In this invention, the morpholine and sulfur monochloride reactants are employed in essentially stiochiometric ratios. This means that about 2 mols of morpholine are combined with one mole of sulphur monochloride.

Any suitable organic solvent which is water-immiscible and inert may be employed in the present invention including those disclosed in U.S. Pat. Nos. 2,259,164, 2,343,524, 2,417,954 and 2,766,236 which are included herein by reference. The preferred solvents are aliphatic hydrocarbons, such as hexane, heptane, methylcyclohexane and mixtures thereof. The amount of solvent is that which is satisfactory to provide a diluent for the reaction of morpholine and sulfur monochloride.

As stated heretofore, it is critical to have at least about 5% water based upon the weight of morpholine in the mixture of morpholine and solvent prior to the addition of any sulfur monochloride. The yield of morpholine disulfide is substantially reduced if less water is used. Moreover, the required water content reduces any tendency to form crystalline morpholine hydrochloride. Although the upper water limit is not critical, it may depend upon the equipment used. Generally, the water does not exceed 300% based upon the weight of morpholine. The preferred water content in the mixture of morpholine and solvent is between 10% and 200% based upon the weight of morpholine.

In accordance with a first specific embodiment of this invention, the mixture of morpholine, solvent and water is free from any alkali metal hydroxide prior to the addition of sulfur monochloride. After part of the sulfur monochloride has been added, e.g., about 5–45% of the required sulfur monochloride, an aqueous solution of alkali metal hydroxide may be added concurrently in order to maintain some free morpholine in the reaction mixture but to finish simultaneously or slightly ahead of the remaining amount of sulfur monochloride. The added sulfur monochloride may be premixed with one of the aforementioned solvents. The added alkali metal hydroxide is generally sodium hydroxide, potassium hydroxide or mixtures thereof. The alkali metal hydroxide is employed in an amount which is sufficient to neutralize all the hydrogen chloride formed during the reaction. The concentration of the added solution of alkali metal hydroxide is generally about 10% to 25%.

Any suitable temperature may be used for the reaction. Generally the temperature is between 0° and 60° C., preferably between 10° and 40° C.

The morpholine disulfide end product may be recovered by any satisfactory procedure. One advantage of the present invention is that the morpholine disulfide can be recovered simply by filtering, washing free of sodium chloride by-product and drying.

In another specific embodiment of the present invention, a mixture of morpholine, water and hexane is formed in the absence of any alkali metal hydroxide. All of the required sulfur monochloride is subsequently added to this mixture simultaneously with the addition of an aqueous solution of alkali metal hydroxide. Subsequent procedures and conditions may be the same as heretofore described for the first embodiment.

In a still another specific embodiment of the invention, a mixture is provided which contains morpholine, solvent, water and an amount up to about 10%, e.g., about 5% to 10%, alkali metal hydroxide based upon the concentration in water. It is critical in this embodiment, however, not to exceed a 10% alkali metal hydroxide content based upon water since higher amounts will substantially decrease the yield of morpholine disulfide. Surfur monochloride is then added to the mixture in conjunction with additional alkali metal hydroxide solution. The subsequent procedures and conditions heretofore described for the first embodiment are also applicable to this embodiment.

It is optional in this invention to use a surfactant in the reaction mixture since the efficiency of agitation is improved by its dispersing effect upon the product. It also decreases the attraction between the product and the solvent. The surfactant also produces a slurry which can be poured readily from the reaction vessel rather than requiring scraping. The slurry is also readily filtered and washed. Any suitable surfactant may be employed, such as anionic surfactants, nonionic surfactants, and mixtures thereof. The following surfactants, among others, are satisfactory; alkylbenzenesulfonates, such as the sodium and potassium salts having a branched or straight chain alkyl portion of about 9 to about 15 carbon atoms, alkyl sulfates, such as the sodium and triethanolammonium salts of $C_{10}$–$C_{20}$ alkyl sulfuric acid, prepared by sulfating the alcohols derived from coconut oil or tallow, or prepared synthetically; the alkali metal and ammonium salts of the sulfated ethoxylates of a long-chain alcohol and 3 to 5 molar proportions of ethylene oxide; the compounds known as "Medialans," which are amido carboxylic acids formed by condensing fatty acids or $C_8$–$C_{22}$ chain length with sarcosine, $CH_2NH_2CH_2COOH$ with the alkali metal and basic nitrogen-radical salts being suitable; alkanesulfonates, such as ammonium dodecanesulfonate; alkoxyhydroxypropanesulfonates, such as the water-soluble salts of 3-dodecyloxy-2-hydroxy-1-propanesulfonate; soaps formed usually by the reaction of caustic alkalies with natural glyceridic fats and oils, generally prepared in high purity, and having the generic molecular formula RCOONa, wherein R is a straight-chain hydrocarbon group having from about 8 to about 22 carbon atoms; the Pluronics, formed by condensing propylene oxide with propylene glycol to a molecular weight of about 600–2500 to form a base followed by condensing ethylene oxide to this base to the extent of about 10% to about 90%, total molecule basis (U.S. Pat. Nos. 2,674,619 and 2,677,700); compounds formed by the simultaneous polymerization of propylene oxide and ethylene oxide, and containing randomly positioned oxypropylene and oxyethylene groups (U.S. Pat. Nos. 2,979,528, 3,036,118, 3,022,335, 3,036,130 and 3,048,548; alkyl phenols having 9–12 carbon atoms in the alkyl portion (straight or branched) ethoxylated with 4–10 molar proportions of ethylene oxide; ethoxylates of fatty alcohols having 8–18 carbon atoms per molecule and 5 to 30 molar proportions of oxyethylene groups; and mixtures thereof. When employed, the surfactant may range from 0.05% to 0.5%, preferably 0.1% to 0.2%, based on the weight of morpholine.

Thus, in accordance with the process of this invention it is now possible to increase the yield of morpholine disulfide without employing any extensive extraction procedures. Furthermore, the end product has a desirable white color and it can be used as an accelerator in the sulfur vulcanization of rubbers, such as butadienestyrene (SBR) rubber, butadiene-acrylonitrile (NBR) rubber and the like. The morpholine disulfide is also particularly suitable in the vulcanization of ethylene-propylene-diene terpolymer (EPDM) rubbers.

The following examples are submitted to illustrate but not to limit this invention. Unless otherwise indicated, all parts and percentages in the specification and claims are based upon weight.

EXAMPLE I

A reactor was charged with 250 milliliters of hexane, 90 grams morpholine and as indicated in Table 1 various amounts of water and surfactant which is a blend of alkyl aryl sulfonate and polyoxyethylene derivative. A caustic feed tank was charged separately with a 25% aqueous caustic solution (158.5 grams) of sodium hydroxide. A sulfur monochloride feed tank was also charged separately with 67.5 grams sulfur monochloride and 83 milliliters hexane.

The sulfur monochloride solution was fed gradually to the reactor with cooling to 20–40° C. and with moderate agitation. After 30–40% of the sulfur monochloride charge was introduced, the caustic charge was fed concurrently with the remaining sulfur monochloride but finishing slightly ahead of the sulfur monochloride. Additional water (150 milliliters including the amount initially in the reactor) was added. After cooling to 13–15° C. and filtering, the yield of morpholine disulfide was determined as indicated in Table 1.

TABLE 1

| Run number: | Initial water (g.) | Surfactant (g.) | Yield (percent) |
|---|---|---|---|
| 1 | 9.0 | 0.13 | 95.3 |
| 2 | 150.0 | 0.13 | 95.3 |
| 3 | 38.5 | 0.13 | 97.0 |
| 4 | 25.0 | 0.13 | 97.0 |
| 5 | 25.0 | 0.13 | [1] 98.3 |
| 6 | 25.0 | None | 94.6 |
| 7 | 25.0 | 0.13 | [2] 96.8 |
| 8 | 25.0 | 0.13 | 97.2 |
| 9 | 25.0 | 0.05 | 96.0 |
| 10 | 1.8 | 0.13 | 89.4 |
| 11 | None | None | 87.0 |

[1] Filtered at 4° C.
[2] Stood overnight prior to filteration.

As shown in Table 1, high yields of morpholine disulfide were obtained in accordance with the process of this invention, i.e., Run Nos. 1–9, and the products had a white color. A low yield was provided in Run No. 11 when no water was used in the initial charge. The criticality of using at least 5% water in the initial charge is demonstrated in Run No. 10 since a low yield was obtained when an insufficient amount of water was used in the initial charge.

EXAMPLE II

The procedure of Example I was repeated except that the reactor was charged initially with 38.5 grams water, 0.13 gram surfactant, 90 grams morpholine and 250 milliliters hexane. All of the sulfur monochloride charge was subsequently added simultaneously with the aqueous caustic solution at essentially the same rate. The yield was 96.1% and the morpholine disulfide had a white color.

This example demonstrates a specific embodiment of this invention.

EXAMPLE III

Following the procedure of Example I, the reactor was mixed initially with 37 grams water, 0.13 gram surfactant, 4.0 grams sodium hydroxide, 90 grams morpholine and 250 milliliters hexane. The sulfur monochloride charge and remaining caustic charge were added simultaneously to this mixture. The yield was 95.1% and the morpholine disulfide had a white color.

As a control, the procedure of this example was repeated with an initial mixture in the reactor containing 90 grams morpholine, 250 milliliters hexane, 269 grams water and 39.6 grams sodium hydroxide. To this mixture was added the sulfur monochloride charge. The yield was 86.5%.

This example demonstrates the criticality of having not more than about 10% of alkali metal hydroxide based on concentration in water in the reactor prior to the addition of sulfur monochloride. In the control process a low yield was obtained when the alkali metal hydroxide in the initial mixture was 12.8% based on concentration in water.

Having set forth the general nature and specific embodiments of the present invention, the true scope is now particularly pointed out in the appended claims.

What is claimed is:

1. In the process for preparing morpholine disulfide from morpholine and sulfur monochloride in the presence of a solvent, the improvement which comprises mixing morpholine, a solvent, which is water-immiscible and inert, at least 5% water based on the weight of morpholine and 0 to about 10% by weight of alkali metal hydroxide based on concentration in water prior to any sulfur monochloride addition; and adding subsequently to this mixture sulfur monochloride and an aqueous solution of alkali metal hydroxide.

2. The process according to claim 1 in which the solvent is an aliphatic hydrocarbon.

3. The process according to claim 1 in which the solvent is hexane.

4. The process according to claim 1 in which the alkali metal hydroxide is sodium hydroxide.

5. The process according to claim 1 in which the morpholine disulfide is recovered by filtering, washing and drying.

6. In the process for preparing morpholine disulfide from morpholine and sulfur monochloride in the presence of a solvent, the improvement which comprises mixing morpholine, a solvent which is water-immiscible and inert, a surfactant, and at least 5% water based on the weight of morpholine in the absence of an alkali metal hydroxide prior to any sulfur monochloride addition; adding subsequently to this mixture part of the sulfur monochloride; and adding the remaining part of the sulfur monochloride concurrently with an aqueous solution of alkali metal hydroxide.

7. In the process for preparing morpholine disulfide from morpholine and sulfur monochloride in the presence of a solvent, the improvement which comprises mixing morpholine, a solvent which is water-immiscible and inert, a surfactant, and at least 5% water based on the weight of morpholine in the absence of an alkali metal hydroxide prior to any sulfur monochloride addition; and adding subsequently to this mixture sulfur monochloride concurrently with an aqueous solution of alkali metal hydroxide.

8. In the process for preparing morpholine disulfide from morpholine and sulfur monochloride in the presence of a solvent, the improvement which comprises mixing morpholine, a solvent which is water-immiscible and inert, a surfactant, at least 5% water based on the weight of morpholine and an amount up to about 10% by weight of alkali metal hydroxide based on concentration in water prior to any sulfur monochloride addition; and adding subsequently to this mixture sulfur monochloride and an aqueous solution of alkali metal hydroxide.

9. The process according to claim 1 in which the morpholine and solvent is mixed with between at least 5% and 300% water based on the weight of morpholine.

10. The process according to claim 1 in which the water contains by weight about 5% to 10% alkali metal hydroxide.

11. The process according to claim 2 in which the aliphatic hydrocarbon is hexane, heptane, methylcyclohexane or mixtures thereof.

References Cited

UNITED STATES PATENTS 2,766,236  10/1956  Harman _____ 260—247.5

ALEX MAZEL, Primary Examiner

J. TOVAR, Assistant Examiner